United States Patent Office 3,799,783
Patented Mar. 26, 1974

3,799,783
SILVER HALIDE EMULSION CONTAINING SENSITIZING DYE COMBINATION
Ruth Linda Hill, Carlisle, and Alan E. Rosenoff, Boston, Mass., assignors to Polaroid Corporation, Cambridge, Mass.
Filed Jan. 3, 1972, Ser. No. 214,745
Int. Cl. G03c 1/14
U.S. Cl. 96—124          11 Claims

ABSTRACT OF THE DISCLOSURE

A film unit is disclosed wherein a photosensitive silver halide emulsion is given improved green sensitivity by spectrally sensitizing said emulsion with a combination of unsymmetrical 2'-cyanine and benzimidazolocarbocyanine dyes.

BACKGROUND OF THE INVENTION

Field of the invention

This invention deals with photography and, more particularly, with products and processes wherein photosensitive silver halide emulsions are spectrally sensitized to the green region of the visible spectrum.

DESCRIPTION OF THE PRIOR ART

Those skilled in the photographic art are aware that the photoresponse of an ordinary silver halide emulsion is generally limited to the blue and violet regions of the visible spectrum. However, it has been found that the addition of certain cyanine and related dyes to a silver halide emulsion extends the resulting emulsion's photoresponse approximately to the spectral regions absorbed by said dyes, when said dyes are adsorbed onto the surface of the silver halide crystal. The cyanine dyes are those conforming to an amidinium ion system in which both nitrogen atoms are included in separate heterocyclic ring systems and in which the conjugated chain joining the nitrogen atoms passes through a part of each heterocyclic ring.

Sensitizing dyes of the above type are normally distributed uniformly throughout a washed, finished emulsion in concentrations depending on the sensitometric characteristics of the particular emulsion and the effects desired.

Common photographic practice is to incorporate the dye into the silver halide emulsion at that concentration producing the maximum sensitization. Typically, this incorporation begins with a quantity of dye being dissolved in a low molecular weight organic solvent such as methanol, acetone, or pyridine. A volume of the solution thus prepared, is slowly added with stirring to an ordinary flowable silver halide emulsion until said dye is thoroughly dispersed in the emulsion. The sensitized emulsion thus prepared is coated, exposed, and developed according to usual photographic techniques.

It has long been known that benzimidazolocarbocyanine dyes are useful in sensitizing photographic silver halide emulsions to the green region of the spectrum, i.e. that portion of the spectrum lying between 500 mμ and 600 mμ, since they are generaly characterized by very sharp absorption in that region. Dyes of this type have been previously described in the technical and patent literature. See, for example, Jones U.S. Pat. No. 2,945,763, issued July 19, 1960, Jones and Spence U.S. Pat. No. 2,912,329, issued Nov. 10, 1959 and Carroll and Jones U.S. Pat. No. 2,701,198, issued Feb. 1, 1955.

However, many of the benzimidazolocarbocyanine dyes suffer from the disadvantage that their maximum adsorptions are so deep and sharp at one particular wavelength, such as for example, 575 mμ, that there is inadequate sensitivity to the remaining portions of the green region, such as, for example, the portion from 500 mμ to 560 mμ. This inadequacy ultimately results in pictures with poor green color reproduction, particularly with regard to color balance.

BRIEF SUMMARY OF THE INVENTION

It has now been discovered that the spectral sensitization of a photographic silver halide emulsion with a specific, limited class of unsymmetrical 2'-cyanine dyes in combination with a specific, limited class of benzimidazolocarbocyanine dyes, both of which classes are detailed hereinafter, provides improved spectral sensitivity in the green region of the visible spectrum.

In particular, the unsymmetrical 2'-cyanine dyes useful in the practice of the present invention may be represented by the formula:

(I) 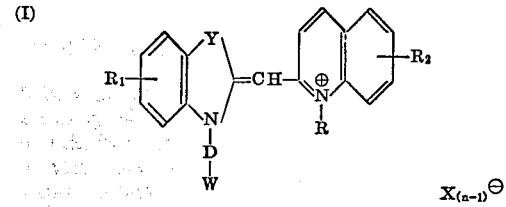

$X_{(n-1)}{}^\ominus$ wherein Y is S or Se; $R_1$ and $R_2$ each represent hydrogen or a lower alkoxy group; D represents a lower alkylene group, i.e. a straight or branched bivalent hydrocarbon group having from 2 to 4 carbon atoms; R represents a lower alkyl group, i.e. an acyclic univalent hydrocarbon group having from 1 to 2 carbon atoms; n represents the positive integer 1 or 2, X represents an inion, and W represents the acid group —COOH or —SO$_3$H when n is the integer 2; or its negatively charged counterpart, —COO$^\ominus$ or —SO$_3{}^\ominus$, when n is the integer 1.

The benzimidazolocarbocyanine dyes useful in combination with the unsymmetrical 2'-cyanine dyes described diately above may be represented by the following formula:

(II) 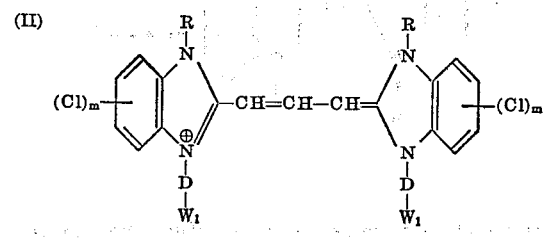

wherein R and D have the above definitions; m is the positive integer 1 or 2; one of the groups designated $W_1$ is the group —SO$_3$H or the hydrogen of said group is replaced by an alkali metal ion, such as sodium (Na$^+$) or potassium (K$^+$), to form an alkali metal salt thereof; and the other $W_1$ is the group —SO$_3{}^\ominus$.

The combination of the present invention has been found to be particularly useful when employed to spectrally sensitize a silver halide emulsion which has associated therewith an appropriate subtractive color-providing material, e.g. a magenta dye-developer compound which contains, in the same molecule, both the chromophoric system of a dye and also a silver halide developing function, in a photographic element wherein subtractive color reproduction is provided by diffusion transfer techniques. In a preferred form, the dyes constituting the combination of the present invention exhibit increased solubility in the usual cyanine dye solvents, such as methanol, ethanol and aqueous mixtures thereof, making said dyes most advantageous for practical employment.

It is therefore an object of this invention to provide a photosensitive element having therein a silver halide emulsion sensitized to the green region of the visible spectrum with the combination of dyes set forth hereinbefore. Other objects of this invention will in part be obvious and will in part appear hereinafter.

For a fuller understanding of the nature and objects of the invention, reference should be had to the following detailed description taken in connection with the accompanying drawings wherein.

DETAILED DESCRIPTION OF THE INVENTION

Figure 1:
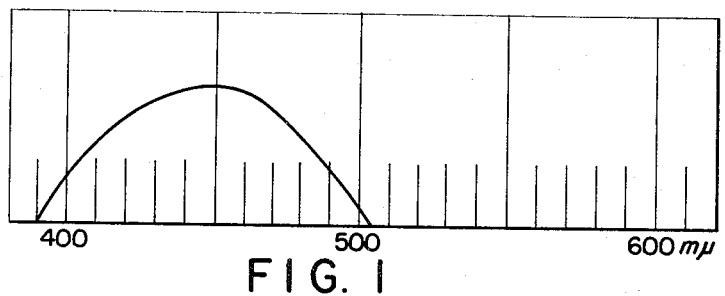
FIG. 1 is a graphic illustration of a spectral sensitivity curve reproduced from a wedge spectrograph of film unit having a gelatino-silver iodobromide emulsion with no spectral sensitizer added.

As used in this specification and in the appended claims, the term unsymmetrical cyanine dye designates a cyanine dye having an amidinium ion system in which one of the nitrogen atoms is included within a benzothiazole or benzoselenazole heterocyclic ring system and the other is included with a 2-quinoline heterocyclic nucleus, and in which the conjugated bridge between said heterocyclic nuclei comprises a single methine group (=CH—), whereas the term benzimidazolocarbocyanine dye refers to a cyanine dye wherein said conjugated bridge comprises a three-carbon linkage (=CH—CH=CH—) and both of said heterocyclic nuclei are of the benzimidazole series.

As previously indicated, one limited class of cyanine dyes within the scope of this invention is represented by Formula I, i.e.:

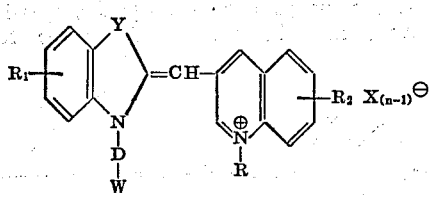

Y in the above formula may be a sulfur atom, S, making the heterocyclic ring system in which it is included one of the benzothiazole series. Alternatively, Y may be a selenium atom, Se, in which case said heterocyclic ring system is one of the benzoselenazole series. Although dyes of Formula I above where Y is either S or Se are effective in the practice of this invention, those dyes wherein Y is S are considered preferable because they are relatively inexpensive and convenient to manufacture.

$R_1$ and $R_2$ each represent hydrogen or a lower alkoxy group. A lower alkoxy group is defined for the purposes of this application as a methoxy or ethoxy group. Both $R_1$ and $R_2$ of Formula I may be the same or different, and are preferably 5-methoxy or 6-methoxy groups. Dyes of Formula I with a 5-methoxy substituent on the benzothiazole group and a 6-methoxy substituent on the 2-quinoline group are employed in the preferred embodiment of the instant invention.

As previously described, W may represent a carboxylic acid group (—COOH) or a sulfonic acid group (—SO$_3$H), when an "external anion," designated in Formula I as X, is made available. Alternatively, W may represent the negatively charged counterparts to said groups, i.e. —COO$^\ominus$ or —SO$_3^\ominus$, when there is no anion X present, said negative charge owing to the loss of a hydrogen from the carboxylic acid or sulfonic acid group. The above formula represents this alternative by providing that the subscript $n$ of X may be the positive integer 1, in which case there is no anion X, or the positive integer 2, in which case there is an anion X.

The "external anion" represented by the designation X comprises those anionic radicals customarily used in the cyanine dye art, for example, chloride, bromide, iodide, methylsulfate, ethyl sulfate, p-toluenesulfonate, benzenesulfonate, methanesulfonate, acetate, propionate, cyanate, perchlorate, etc.

The unsymmetrical 2'-cyanine dyes most preferably selected for the practice of this invention are those dyes represented by Formula I wherein $n$ is 1 and which dyes require no "external anion" (X), but instead form a betaine form, alternatively referred to as an "internal salt" or "zitterion" form, wherein the anion is the negatively charged group represented by W when $n$ is 1, and the cation is the amidinium ion system with its positive charge shared between the terminal nitrogen atoms of said system. It should be understood that all formulae set forth herein represent an illustration of only one form of structure and that the actual cyanine dyes involved are resonance hyrids of a series of structures according to principles well known in the art.

Dye molecules possessing the last-mentioned "betaine" arrangement exhibit increased solubility over the "external anion" form in the usual cyanine dye solvents such as, for example, methanol and methanol/water mixtures. Furthermore, the synthesis of the particular cyanine dye wherein the product is the "external anion" form usually results in varying amounts of the betaine form being produced as well. A much more repeatabe synthesis of the particular cyanine dye is obtained when said synthesis is designed to yield only the betaine form, as described in detail hereinafter, and, if desired, converted to the "external anion" form at some subsequent time.

In Formula I above, the designation D represents a lower alkylene group, defined as a straight or branched bivalent hydrocarbon group having from 2 to 4 carbon atoms, such as, for example, methylene, ethylene, trimethylene, tetramethylene, ω-methyltrimethylene, and the like. When the groups represented by D and W are taken together in said formula, alternative terminology is available and would include such carboxyalkyl and sulfoalkyl groups as, for example, carboxymethyl, α-carboxyethyl, β-carboxyethyl, γ-carboxypropyl, γ-carboxybutyl, δ-carboxybutyl, sulfomethyl, α-sulfoethyl, β-sulfoethyl, γ-sulfopropyl, γ-sulfobutyl, δ-sulfobutyl and the like.

From the description hereinafter, it will be appreciated that a requisite function of the dye sensitizers of the present invention is that they be non-migratory—for were they to diffuse, they might provide a chromatically deleterious effect to any ultimate image formed. In general, the migration propensities of the denoted sensitizers may best be controlled by choosing appropriate alkylene groups, D, in Formulas I and II above. Furthermore, it has been found that sensitized silver halide emulsions utilizing cyanine dye materials of the hereindenoted class do not lose spectral sensitization, i.e., are not antisensitized, in the presence of dye developers and other materials commonly utilized in diffusion transfer photographic systems. However, it has been found that the moities denoted as W and $W_1$ in Formulas I and II, respectively, must be acid functional in order to assure proper sensitizer adsorption and no antisensitization.

The designations R in the above formulae represent lower alkyl groups, defined for purposes of this application as univalent acyclic hydrocarbon groups having from 1 to 2 carbon atoms, such as methyl or ethyl.

As illustrative examples of dyes contemplated by Formula I, mention may be made of the following:

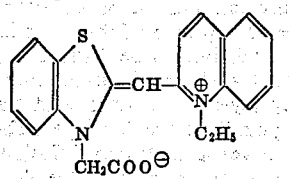

3-carboxymethyl-1'-ethylthia-2'-cyanine betaine

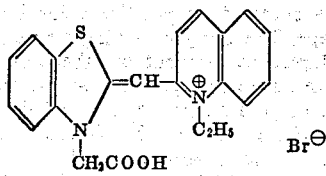

3-carboxymethyl-1'-ethylthia-2'-cyanine bromide

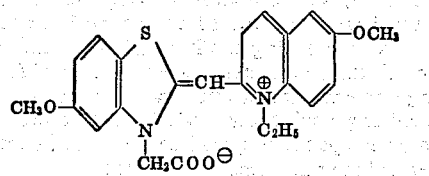

3-carboxymethyl-1'-ethyl-5,6-dimethoxythia-2'-cyanine betaine

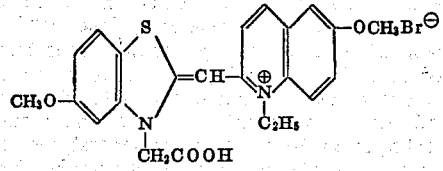

3-carboxymethyl-1'-ethyl-5,6'-dimethoxythia-2'-cyanine bromide

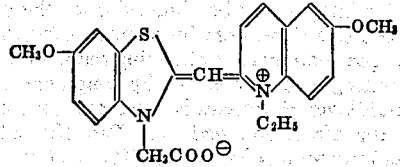

3-carboxymethyl-1'-ethylthia-6,6'-dimethoxy thia-2'-cyanine betaine

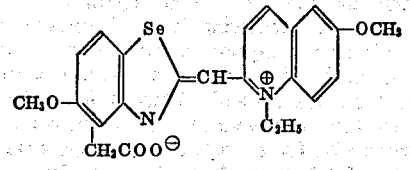

3-carboxymethyl-1'-ethyl-5,6'-dimethoxyselena-2'-cyanine betaine

A procedure for the preparation of two of the dyes of Formula I useful in the preferred embodiment of the present invention is given in Examples I and II, set forth hereinafter.

The benzimidazolocarbocyanine dyes represented by Formula II, i.e.

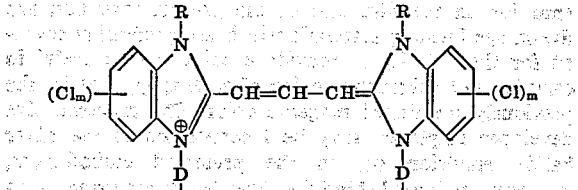

wherein R and D have the above definitions, $m$ is the positive integer 1 or 2, and one of the $W_1$ groups is the sulfonic acid group —$SO_3H$, or the alkali metal salt thereof and the other $W_1$ is the group —$SO_3^\ominus$, are known in the art. See, for example, the aforementioned Jones U.S. Pat. No. 2,945,763 and Jones and Spence U.S. Pat. No. 2,912,329.

The above form of dye may alternatively be referred to as the "betaine," "anhydro" or "zwitterion" form because of its "internal" anion and cation arrangement. The dyes of Formula II have the conventional resonance system of cyanine dyes described hereinbefore so it is to be understood that the particular resonance structure shown in Formula II is merely illustrative, and that the negative charge can be on either $W_1$ group, or both (when the hydrogen of the acid group is replaced with a positively-charged alkali metal ion). A zwitterion results in either case.

As an illustrative example of a dye of Formula II particularly useful in the practice of the present invention, mention may be made of the following:

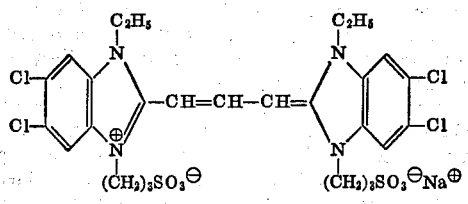

5,5',6,6'-tetrachloro-1,1'-diethyl-3,3'-bis(γ-sulfopyropyl) benzimidazolocarbocyanine betaine sodium salt Dyes of Formula II can be advantageously prepared by methods disclosed in the art. See, for example, U.S. Pat. No. 2,912,329, particularly Example 3 therein; and U.S. Pat. No. 2,945,763, particularly Example C therein. The preparation of the particular dye mentioned above is set forth in detail in Example III hereinafter.

In a representative embodiment of this invention, one or more of the unsymmetrical cyanine dyes represented by Formula I together with one or the benzimidazolocarbocyanine dyes represented by Formula II are incorporated into a silver halide emulsion. Preferably, the dye of Formula II is added first, followed by the dye or dyes of Formula I at intervals from 1 to 5 minutes. The techniques of incorporating said dye combination into the silver halide emulsion are substantially similar to that previously outlined with reference to the use of a single sensitizing dye and those disclosed in the art. Each of the dyes may be dissolved, or otherwise distributed, in a suitable medium, such as methanol, or water, or a mixture of both methanol and water, and appropriate amounts of each medium containing the sensitizing dyes may be slowly added in the desired sequence to a flowable silver halide emulsion and stirred or otherwise agitated until said dyes are uniformly dispersed throughout the emulsion. Alternatively, the solutions containing the dyes may be combined before addition to the silver halide emulsion and a single solution of the dyes employed. Preferably, concentrations of the above-described dye solutions are in the range of 2–3 mg./ml.

The concentrations of the sensitizing dyes in the silver emulsion may be varied according to the characteristics of the particular silver halide emulsion and the sensitizing effect desired as is well known to those skilled in the photographic art. Ordinarily the preferred concentration of the unsymmetrical cyanine dyes of Formula I in the silver emulsion has been found to be from about 0.4 to 1.3 mg. per g. of silver whereas the optimum concentration of the benzimidazolocarbocyanine dye of Formula II used in combination therewith has been found to be in the range of 0.5 mg. per g. of silver. Of course, the optimum concentration of the combination of cyanine dyes of this invention can be changed in total or by varying the amount of one dye relative to the amount of the other. Clearly, however, this invention is directed to any emulsion containing a combination of the above-mentioned cyanine dyes whereby improved green sensitization is obtained.

The photoresponsive material of the photographic emulsion will preferably comprise a crystal of silver, for example, one or more of the silver halides such as silver chloride, silver iodide, silver bromide, or mixed silver halides, such as silver chlorobromide or silver iodobromide, of varying halide ratios and varying silver concentrations.

The silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various flocculation systems, or procedures, adapted to effect removal of undesired components; after-ripening the dispersion at an elevated temperature in combination with the addition of gelatin and various adjuncts, for example, chemical sensitizing agents; all according to the traditional procedures of the art as described, for example, in Neblette, C. B., Photography, Its Materials and Processes, 6th ed., 1962.

As the binder for the emulsion, the aforementioned gelatin may be, in whole or in part, replaced with some other colloidal material such as albumin; casein; or zein, or resins such as cellulose derivatives, polyacrylamides, and vinyl polymers.

Additional optional additives, such as coating aids, hardeners, viscosity-increasing agents, stabilizers, preservatives, and the like, also may be incorporated in the emulsion formulation, according to the conventional procedures known in the photographic emulsion manufacturing art.

As previously mentioned, the present invention has especially useful employment in subtractive color photographic diffusion transfer processes and products, particularly those subtractive color processes which employ dye-developers, i.e. compounds possessing the properties of both a dye and a photographic silver halide developing agent. Such processes and products are well known to the photographic art and are disclosed in a multiplicity of U.S. and foreign patents, such as, for example, Rogers U.S. Pat. No. 2,983,606, issued May 9, 1961, and Green et al. U.S. Pat. No. 3,218,164, issued Nov. 16, 1965.

In general, according to such processes a photosensitive element containing a dye developer and a silver halide emulsion may be exposed to actinic radiation and wetted by a liquid processing composition, in the dark, and the exposed photosensitive element may be superposed prior to during, or after wetting, on a sheet-like support element which may be utilized as an image-receiving element. In a preferred embodiment, the liquid processing composition is applied to the photosensitive element in a substantially uniform layer as the photosensitive element is brought into superposed relationship with the image-receiving layer. The liquid processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by diffusion, to a superposed image-receiving layer or element, said transfer substantially excluding oxidized dye developer. The image-receiving element receives a depthwise diffusion, from the developed emulsion, of unoxidized dye developer without appreciably disturbing the imagewise distribution thereof to provide the reversed or positive color image of the developed image. The image-receiving element may contain agents adapted to mordant or otherwise fix the diffused, unoxidized dye developer. In one disclosed embodiment, the desired positive image is revealed by stripping the image-receiving layer from the photosensitive element at the end of a suitable imbibition period.

In accordance with U.S. Pats. Nos. 3,415,644, 3,415,645 and 3,415,646, an image-receiving element need not be separated from superposed contact with a photosensitive element comprising a silver halide emulsion subsequent to substantial transfer image formation if the image-receiving element is transparent and a processing composition containing a substance rendering the processing composition layer opaque is spread between the image-receiving layer and the photosensitive element.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using the previously mentioned dye developers by several techniques. One such technique contemplates obtaining multicolor transfer images utilizing dye developers by employment of an integral multilayer photosensitive element, such as is disclosed in the aforementioned U.S. Pat. No. 2,983,606, and particularly with referenec to FIG. 9 of the patent's drawing, wherein at least two selectively sensitized photosensitive strata, superposed on a single support, are processed, simultaneously and without separation, with a single, common image-receiving layer. A suitable arrangement of this type comprises a support carrying a red-sensitive silver halide stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets by suitable interlayers, for example, by a layer of gelatin or polyvinyl alcohol.

The dye developers associated with the green-sensitive emulsion in the film unit of the present invention are dye-image-forming materials which are preferably selected for their ability to provide a color that is useful in carrying out subtractive color photography, that is, the previously mentioned magenta color. The magenta dye developer employed may be incorporated in the silver halide emulsion or, in the preferred embodiment, in a separate layer behind the silver halide emulsion. Such a layer of dye developer may be applied by use of a coating solution about 0.5 to 8%, by weight, of the dye developer dispersed in a film-forming natural, or synthetic polymer, for example, gelatin, polyvinyl alcohol, and the like, adapted to be permeated by the chosen diffusion transfer fluid processing composition.

An extensive compilation of specific dye developers particularly adapted for employment in photographic diffusion transfer processes is set forth in aforementioned U.S. Pat. No. 2,983,606 and in the various copending U.S. applications referred to in that patent, especially in the table of U.S. applications incorporated by reference into the patent as detailed in column 27. As examples of additional U.S. patents detailing specific magenta dye developers contemplated for employment in the present invention, mention may also be made of U.S. Pats. Nos. 3,134,672; 3,218,164; 3,563,739; and the like.

Image-receiving elements, particularly adapted for employment in the preceding diffusion transfer processes, comprise a support layer possessing on one surface thereof, in sequence, a polymeric acid layer, preferably an inert timing or spacer layer, and an image-receiving layer adapted to provide a visible image upon transfer to said layer of diffusible dye image-forming substance, such as disclosed in, for example, U.S. Pat. No. 3,362,819.

It will be apparent that, by appropriate selection of the image-receiving element materials from among suitable known opaque and transparent materials, it is possible to obtain either a colored positive reflection print or a colored positive transparency.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 10, and most preferably, a viscosity-increasing compound constituting a film-forming material of the type which, when the composition is spread and dried, forms a relatively firm and relatively stable film. It will be noted that the liquid processing composition employed may also contain one or more auxiliary or accelerating developing agents, such as p-methylaminophenol, 2,4-diaminophenol, p-benzylaminophenol, hydroquinone, toluhydroquinine, phenylhydroquinone, 4'-methylphenylhydroquinone, etc. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It will also be apparent that the relative proportions of the agents of the diffusion transfer processing composition may be altered to suit the requirements of the operator. Thus, it is within the scope of this invention to modify the herein described developing compositions by the substitution of preservatives, alkalies, silver halide solvents, etc., other than those specifically mentioned, and include in the developing composition components such as restrainers, accelerators, etc.

Although the invention has been discussed in detail throughout employing dye developers, the preferred dye image-forming materials, it will be readily recognized that other, less preferred, dye image-providing materials may be substituted in replacement of the preferred dye developers in the practice of the invention. For example, there may be employed dye image-forming materials such as those disclosed in U.S. Pats. Nos. 2,647,049, 2,661,293, 2,698,244, 2,698,798, and 2,802,735, wherein color diffusion transfer processes are described which employed color coupling techniques comprising, at least in part, reacting one or more color developing agents and one or more colors formers or couplers to provide a dye transfer image to a superposed image-receiving layer and those disclosed in U.S. Pat. No. 2,774,668, wherein color diffusion transfer processes are described which employ the imagewise differential transfer of complete dyes by the mechanisms therein described to provide a transfer dye image to a contiguous image-receiving layer.

The present invention will be illustrated in greater detail in conjunction with the following examples which set out representative embodiments and photographic utilization of the present invention which, however, are not limited to the details set forth therein and are intended to be illustrative only.

EXAMPLE I

The unsymmetrical thiacyanine dye, 3-carboxymethyl-1'-ethyl-5,6'-dimethoxythia-2'-cyanine was synthesized by mixing 2.3 g. (0.0072 mol) of 3-carboxymethyl-2-methyl-5-methoxybenzothiazolium bromide with 3.4 g. (0.0073 mol) of 1-ethyl-6-methoxy-2-phenylthio-quinolinium tosylate in 35 ml. liters of pyridine. This mixture was heated to 80° C., and 0.77 g. of triethylamine were added. The resultant mixture was then heated to 100° C. and held at that tempearture for three hours, at which time the mixture was cooled and chilled in an ice-bath. The crude orange dye formed was then filtered off and washed well with acetone. The dye was dried in a vacuum at 90° C. yielding 2.8 g. (94%).

About 2 g. of the crude dye was recrystallized from 100 ml. of a 1:1:1 mixture of pyridine:methyl Cellosolve:water in the presence of basic alumina. Approximately 1.5 g. of the betaine product, i.e., the compound represented by the formula:

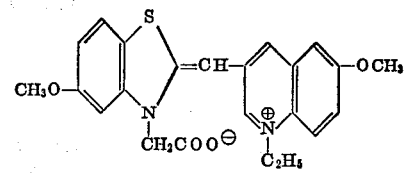

were recovered by the above method.

EXAMPLE II

Using a similar reaction as described in Example I above, the unsymmetrical thiacyanine dye 3-carboxymethyl-1₂-ethylthia-2'-cyanine was prepared utilizing 3-carboxy methyl - 2 - methyl-benzothiazolium bromide and 1-ethyl-2-phenylthioquionlinium tosylate, again producing the internal salt form designated as:

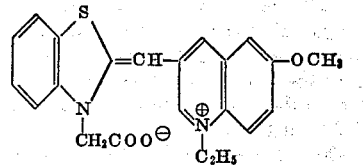

EXAMPLE III

The benzimidazolocarbocyanine dye 5,5',6,6'-tetrachloro-1,1'-diethyl-3,3'-bis(γ-sulfopropyl) benzimidazolocarbocyanine betaine sodium salt was synthesized as follows:

A sodium ethoxide solution was prepared by dissolving 1.15 g. of sodium (0.0500 mol) in 250 ml. of anhydrous ethanol. Then, 3.69 g. (0.0100 mol.) of the compound 1 - ethyl- 2 -methyl-3-(γ-sulfopropyl)-5,6-dichlorobenzimidazolium betaine were combined with 2.13 g. (0.110 mol) of 2,2,2-trichloro-1-ethoxy ethanol and subsequently added, with rapid stirring, to the sodium ethoxide solution all at once. The resultant reaction mixture was stirred and refluxed for 1½ hrs. After being refrigerated for 2 hrs. the brick-red dye was collected and washed with a little chilled ethanol. Finally, the dye product was washed with 200 ml. of water and then washed with acetone and dried. The yield was 2.70 g. (67%) of the dye of the formula:

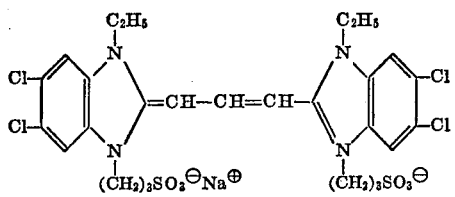

EXAMPLE IV

A monochromatic photosensitive element was prepared by coating, in succession, on a gelatin subcoated cellulose triacetate film base the following layers:

(1) A magenta dye-developer layer containing about 50 mg./ft.$^2$ of the 1:1 chrom-complexed azo dye developer represented by the formula:

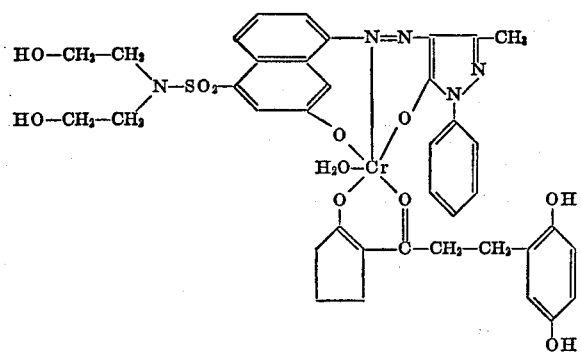

(2) A layer comprising a gelatino-silver iodobromide emulsion which had not been spectrally sensitized. Said emulsion had a silver concentration of 377 mg./ml. and was coated at a coverage of about 66 mg./ft.$^2$ of silver.

Additional photosensitive elements substantially of the last-identified type were prepared wherein the iodobromide emulsion additionally contained:

(1) 0.04 mg. of 5,5',6,6'-tetrachloro-1,1'-diethyl-3,3'-bis-(γ-sulfopropyl) benzimidazolocarbocyanine betaine sodium salt (as prepared according to Example III above) per gm. of silver; accomplished by adding to 15.9 ml. of said emulsion at 40° C., 1.15 ml. of an aqueous dispersion of said dye at a concentration of 2.08 mg./ml.

(2) The same as No. 1 immediately above, and in addition, 0.8 mg. of 3-carboxymethyl-1'-ethyl-5,6'-dimethoxythia-2'-cyanine betaine (as prepared according to Example I above) per gram of silver; accomplished by adding to the emulsion of No. 1 above at 40° C., 2.35 ml. of a methanolic solution of said dye at a concentration of 2.04 mg./ml.

(3) The same as No. 1 immediately above, and in addition, 0.5 mg. of 3-carboxymethyl-1'-ethylthia-2'-cyanine betaine (as prepared according to Example II above) per gram of silver; accomplished by adding to the emulsion of No. 1 above at 40° C., 1.58 ml. of a 50% methanol/ 50% water solution of said dye at a concentration of 1.90 mg./ml.

(4) The same as No. 1 immediately above, and in addition, 0.5 mg. of 3-carboxymethyl-1'-ethylthio-2'-cyanine betaine and 0.8 mg. of 3-carboxymethyl-1'-ethyl-5,6'-dimethoxythia-2'-cyanine betaine per gram of silver; accomplished by adding to the emulsion No. 1 above at 40° C., one minute after the addition of said benzimidazolocarbocyanine dye thereto, 1.58 ml. of a 50% methanol/50% water solution of 3-carboxymethyl-1'-ethylthia-2'-cyanine betaine at a concentration of 1.90 mg./ml.; and, one minute after the last-mentioned dye, 2.35 ml. of a methanolic solution of 3-carboxymethyl-1'-ethyl-5,6'-dimethoxythia-2'-cyanine betaine at a concentration of 2.04 mg./ml., with continual stirring for 20 minutes thereafter.

Typical diffusion transfer image-receiving elements may be fabricated by coating a cellulose nitrate subcoated baryta paper with the partial butyl ester of polyethylene-maleic anhydride copolymer prepared by refluxing for 14 hours, 300 grams of high viscosity poly-(ethylene/maleic anhydride), 140 grams of N-butyl alcohol and 1 cc. of 85% phosphoric acid to provide a polymeric acid layer approximately 0.75 mil thick. The external surface of the acid layer may then be coated with a 4% solution of polyvinyl alcohol in water to provide a polymeric spacer layer approximately 0.30 mil thick. The external surface of the spacer layer may then be coated with a 2:1 mixture, by weight, of polyvinyl alcohol and poly-4-vinylpyridine at a coverage of approximately 600 mg./ ft.$^2$ to provide a polymeric image-receiving layer. The thus prepared image-receiving element is then baked at 180° F. for 30 minutes and allowed to cool.

Each of the above denoted photosensitized monochromes were exposed to filtered electromagnetic radiation through a step wedge in a spectrograph and processed by spreading an aqueous liquid processing composition comprising:

| | |
|---|---:|
| Water _____cc__ | 100 |
| Potassium hydroxide _____gm__ | 11.2 |
| Hydroxyethyl cellulose _____gm__ | 3.4 |
| N-phenethyl-α-picolinium bromide _____gm__ | 2.7 |
| Benzotriazole _____gm__ | 1.15 |
| 4'-methylphenylhydroquinone _____gm__ | 0.6 | between an image-receiving element and each of the exposed photosensitive monochromatic elements as they were brought into superposed relationship. After an imbibition period of approximately 1 minute, the image-receiving elements were separated from the remainder of the film assembly and the resultant spectrograms are reproduced in FIGS. 1 through 5.

Figure 2:
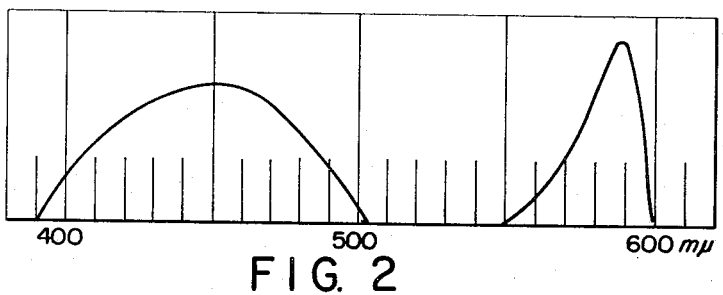
FIG. 2 is a graphic illustration of a wedge spectrograph as in FIG. 1, but showing a spectral sensitivity curve of said emulsion sensitized with a known benzimidazolocarbocyanine dye.

FIG. 1 denotes the inherent sensitivity of the emulsion utilized, whereas FIG. 2 denotes the sensitivity imparted to said emulsion by the addition of the benzimidizolocarbocyanine dye, 5,5',6,6' - tetrachloro - 1,1' - diethyl-3,3'-bis(γ-sulfopropyl) benzimidazolocarbocyanine betaine sodium salt, as prepared in Example III above. It will be noted that the total green region of the spectrum, i.e., from about 500 mμ to 600 mμ, is inadequately covered by the addition of this dye alone since a void in sensitivity occurs in the region from about 500 to 560 mμ.

Figure 3:
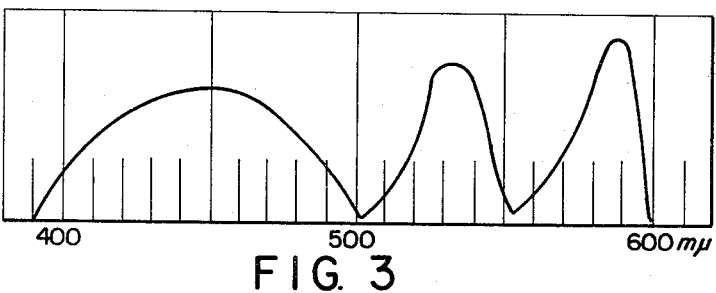
FIGS. 3–5 are graphic illustrations of wedge spectrograms as described for FIGS. 1 and 2, but showing a spectral sensitivity curve of said emulsion sensitized with various identified combinations of cyanine dyes as set forth in detail hereinafter.

FIG. 3 denotes the improved green sensitivity of the emulsion of FIG. 2 that results when 3-carboxymethyl-1'-ethylthia-2'-cyanine betaine, as prepared in Example II above, is added to said emulsion. It will be appreciated from observing FIG. 3 that the void in sensitivity exhibited in FIG. 2 above is now filled due to the addition of said thiacyanine dye.

Figure 4:
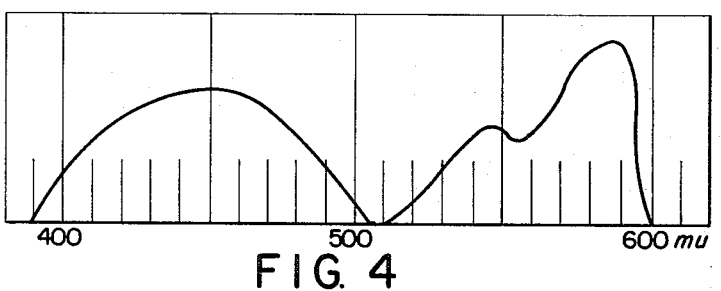

FIG. 4 denotes the improved green sensitivity of the above emulsion that results when another more preferred, thiacyanine dye, 3-carboxymethyl-1'-ethyl-5,6'-dimethoxy-thia-2'-cyanine betaine as prepared in Example I above, is added to the emulsion containing only said benzimidazolo-carbocyanine dye.

Figure 5:
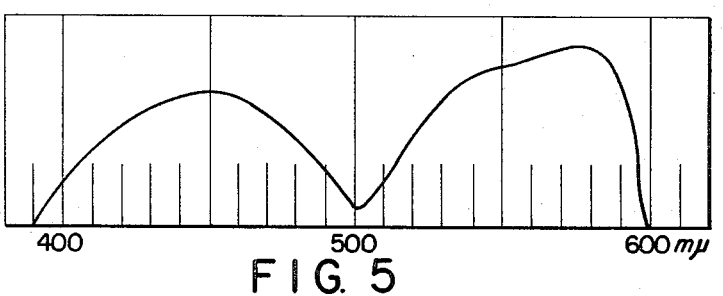

FIG. 5 denotes the improved green sensitivity imparted to the emulsion when the preferred combination of cyanine dyes is utilized, i.e. the combination of 5,5',6,6'-tetrachloro-1,1'-diethyl-3,3'-bis(γ-sulfopropyl) benzimidazolocarbocyanine betaine tetrahydrate sodium salt, 3-carboxymethyl-1'-ethylthia-2'-cyanine betaine and 3-carboxymethyl-1'-ethyl-5,6-dimethoxythia-2'-cyanine betaine as detained hereinbefore. It should be noted that the above preferred combination most effectively sensitizes the emulsion over the entire green region of the spectrum.

Since certain changes may be made in the above product and process without departing from the scope of the invention herein involved, it is intended that all matter contained in the above description or shown in the accompanying drawings shall be interpreted as illustrative and not in a limiting sense,

What is claimed is:
1. A photosensitive element comprising:
silver halide having associated therewith a combination of cyanine dyes comprising an unsymmetrical cyanine dye of the formula:

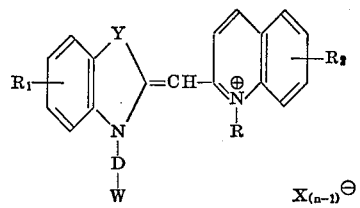

wherein Y is S or Se; R is a lower alkyl group; $R_1$ $R_2$ are each lower alkoxy groups; D is a lower alkylene group; n is the positive integer 1 or 2; X is an anion; and W is a —COOH or a —$SO_3H$ group when n is the integer 2, or W is a —$COO^\ominus$ group or a $SO_3^\ominus$ group when n is the integer 1; and
a benzimidazolocarbocyanine dye of the formula:

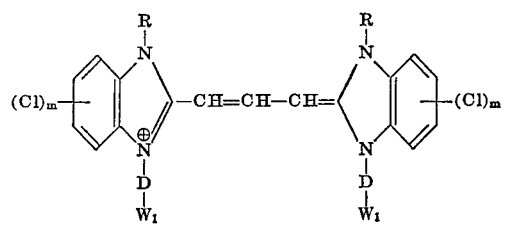

wherein R and D have the above definitions; m is the positive integer 1 or 2; and either designated $W_1$ is an —$SO_3^\ominus$ group and the other $W_1$ is a —$SO_3H$ group or the alkali metal salt thereof.

2. A photosensitive element as defined in claim 1 wherein said unsymmetrical cyanine dye is:

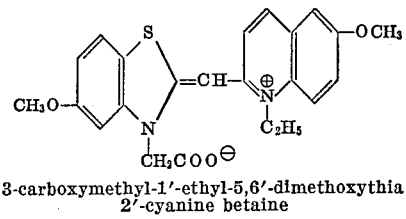

3-carboxymethyl-1'-ethyl-5,6'-dimethoxythia 2'-cyanine betaine

3 A photosensitive element as defined in claim 1 wherein said benzimidazolocarbocyanine dye is:

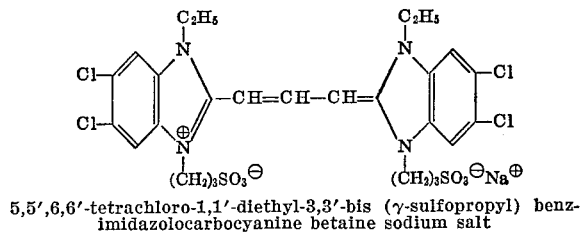

5,5',6,6'-tetrachloro-1,1'-diethyl-3,3'-bis (γ-sulfopropyl) benzimidazolocarbocyanine betaine sodium salt 4. A photosensitive element as defined in claim 1 wherein said combination further comprises an additional unsymmetrical cyanine dye of the formula:

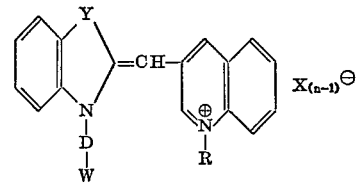

5. A photosensitive element as defined in claim 4 wherein said additional unsymmetrical cyanine dye is:

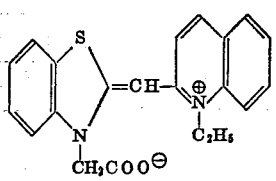

6. A photosensitive element as defined in claim 1 wherein said combination comprises:
5,5',6,6' - tetrachloro - 1,1' - diethyl - 3,3' - bis(γ-sulfopropyl) benzimidazolocarbocyanine betaine sodium salt; and
3 - carboxymethyl - 1' - ethyl - 5,6' - dimethoxythia-2'-cyanine betaine.

7. A photosensitive element as defined in claim 6 wherein said combination further comprises:
3-carboxymethyl-1'-ethylthia-2'-cyanine betaine.

8. A photosensitive element as defined in claim 7 wherein said silver halide has associated therewith a magenta color-providing material.

9. A photosensitive element as defined in claim 8 wherein said color-providing material is a dye-developer compound having both the chromophoric system of a dye and a silver halide developing function.

10. A photographic silver halide emulsion which comprises a combination of cyanine dyes comprising:
an unsymmetrical cyanine dye of the formula:

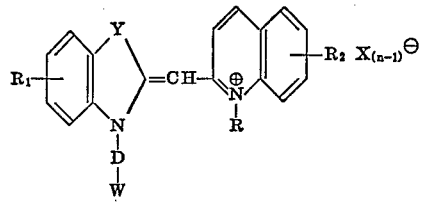

wherein Y is S or Se; R is a lower alkyl group; $R_1$ and $R_2$ are each lower alkoxy groups; D is a lower alkylene group; n is the positive integer 1 or 2; X is an anion; and W is a —COOH or a —$SO_3H$ group when n is the integer 2, or W is a —$COO^\ominus$ group or a $SO_3^\ominus$ group when n is the integer 1; and
a benzimidazolocarbocyaine dye of the formula:

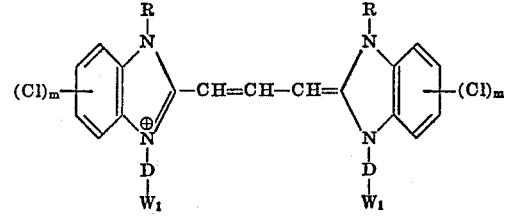

where R and D have the above definitions; m is the integer 1 or 2 and either designated $W_1$ is an —$SO_3^\ominus$ group and the other $W_1$ is a —$SO_3H$ group or the alkali metal salt thereof.

11. A photographic emulsion as defined in claim 10 wherein said combination further comprises an additional unsymmetrical cyanine dye of the formula:

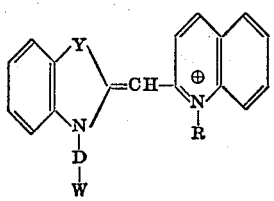

(References on following page)

References Cited

UNITED STATES PATENTS

| | | | |
|---|---|---|---|
| 2,701,198 | 2/1955 | Carroll et al. | 96—124 |
| 3,348,949 | 10/1967 | Bannert et al. | 96—124 |
| 3,617,294 | 11/1971 | Shiba et al. | 96—124 |
| 3,622,316 | 11/1971 | Bird et al. | 96—124 |
| 3,666,480 | 5/1972 | Shiba et al. | 96—124 |

FOREIGN PATENTS

| | | | |
|---|---|---|---|
| 1,223,298 | 2/1971 | Great Britain | 96—124 |

J. TRAVIS BROWN, Primary Examiner

U.S. Cl. X.R.

96—29 D, 132